Feb. 16, 1965   L. H. MORIN   3,169,338
WEEDLESS FISH HOOKS
Filed May 14, 1963
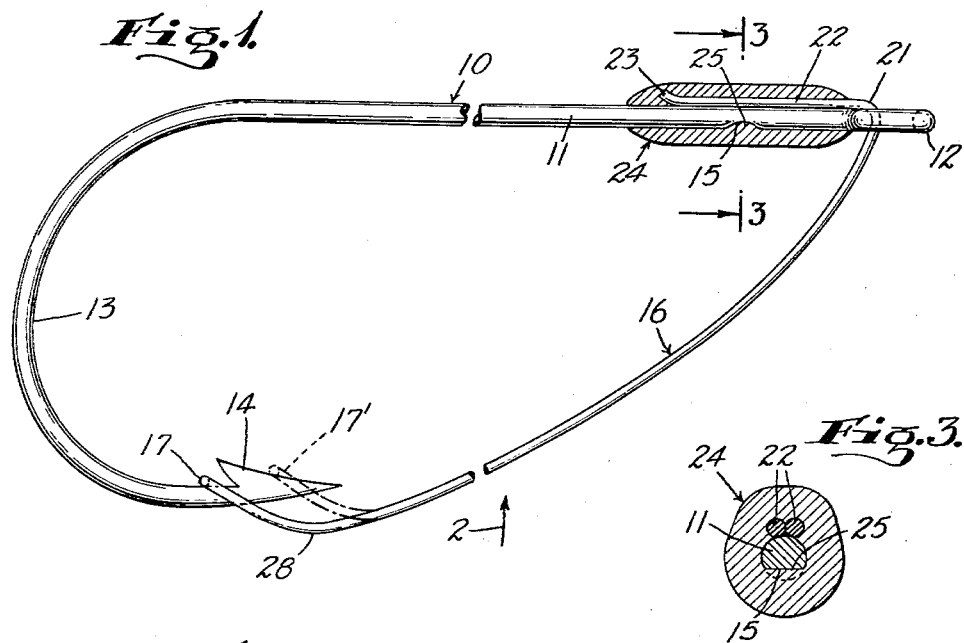
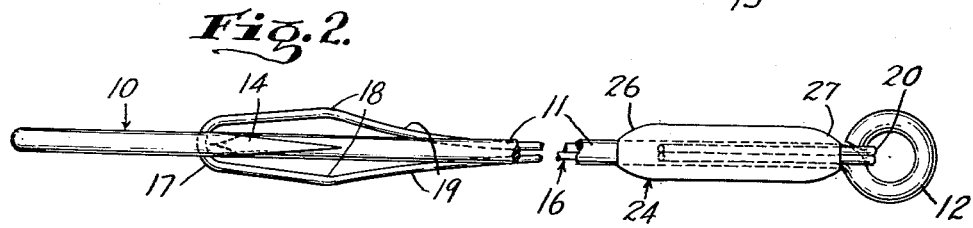
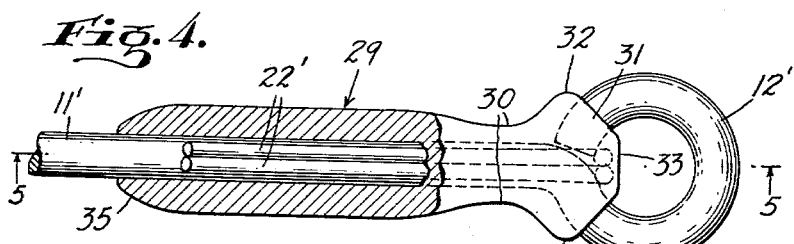
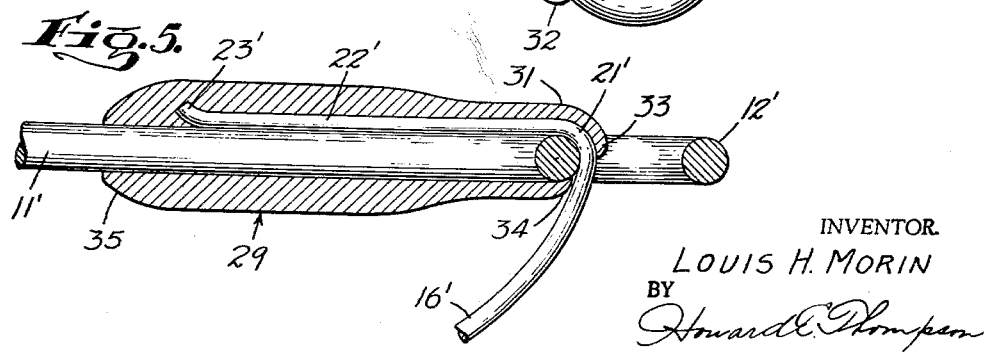
INVENTOR.
LOUIS H. MORIN
BY
Howard E. Thompson
ATTORNEY 3,169,338
WEEDLESS FISH HOOKS
Louis H. Morin, Bronx, N.Y. (125 Beechwood Ave., New Rochelle, N.Y.), assignor of one-fourth to Madeline F. McGill, Denver, Colo., and one-fourth to J. R. Hanna, Bronxville, N.Y.
Filed May 14, 1963, Ser. No. 280,287
2 Claims. (Cl. 43—43.6)

This invention relates to fish hooks including a wire or other strand coupled with the hook and extending to the barbed end of the hook to prevent weeds and the like from coming into direct contact with the hook. More particularly, the invention deals with a hook structure of the character defined, wherein the end or ends of the guard wire or strand employed are passed through the eye of the hook and fixed onto the shank of the hook adjacent the eye by enveloping said ends in a metallic or plastic molded body in definitely retaining the wire or strand against displacement from the hook.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is an enlarged side view of the weedless-type of hook, with parts of the construction broken away and indicating the molded bonding or securing body in section.

FIG. 2 is a view looking generally in the direction of the arrow 2 of FIG. 1.

FIG. 3 is an enlarged section on the line 3—3 of FIG. 1.

FIG. 4 is a view, similar to FIG. 2, showing only part of the construction and showing a modification and with part of the construction broken away and in section; and FIG. 5 is a section on the line 5—5 of FIG. 4.

In illustrating one adaptation of my invention, I have shown at 10 a more or less conventional fish hook, the shank 11 of which has, at one end, an eye 12. The other end portion of the shank extends in a reversely curved portion 13, terminating at its free end in a barb 14. The shank 11 of the hook is modified from normal construction in providing adjacent the eye 12 a key recess 15, the function of which will be later described. At 16 is shown the guard member or element of the weedless hook which, in the present construction, is in the form of what may be termed a U-shaped wire or strand, U-shaped in the sense that the central portion thereof has a looped end 17, note FIG. 2, which can engage the barbed end 14 of the hook, as illustrated in full lines in FIG. 1 or, in some forms of construction, can engage the barbed end, as indicated in dot-dash lines at 17'. The guard, adjacent the looped end 17, is flared slightly, as indicated at 18 in FIG. 2 of the drawing, and then the wire or strand is contracted, as indicated at 19, so that the ends are brought into abutting relationship to each other, particularly where they pass through the eye 12, as clearly seen at 20 in FIG. 2 of the drawing. The ends, where they pass through the eye 12, are bent, as seen at 21 in FIG. 1 of the drawing, and the terminal ends 22 of the wire or strand lie flatly upon and extend longitudinally of the shank 11, as clearly noted in FIG. 1 of the drawing. It will also appear, in said figure, that the ends 23 are bent upwardly a slight extent to definitely key the portions 22 against displacement from the securing or bonding body 24, which can be referred to as an encapsulating shroud and which is molded directly upon the shank 11 and on 22 and 23, the body including a portion 25 which extends into the recess 15 to definitely key the body 24 on the shank. The body 24 has rounded contracted ends 26 and 27, as clearly noted in FIG. 2 of the drawing, the end 27 terminating adjacent the eye 12. Considering FIG. 3 of the drawing, it will appear that the body 24 has the irregular cross-sectional contour shown in said figure and that the metallic or plastic molded material extends around the surfaces of 22, as well as the exposed surfaces of the shank 11. In the accompanying drawing, in order to simplify the illustration, metallic sectioning is shown in the body 24 to represent a die cast metallic body, preferably of lightweight material. It will be understood, however, that plastic material can be utilized to accomplish the same result.

It will be apparent, from a consideration of FIG. 1 of the drawing, that the looped end 17 of the guard 16 extends upwardly and joins the long and slightly curved portion of the guard in a bend 28, in which the offsets 18 and contractions 19 are at least partially formed.

Considering FIGS. 4 and 5 of the drawing, here I have shown a slight modification, in which the shank 11' of the hook does not include the recess 15, as will appear from a consideration of FIG. 5, and the bent portion 21' of the guard 16' extends through the eye 12', the same as in the construction shown in FIGS. 1 and 2 of the drawing, and the portions 22' and 23' are also identical with the showing in FIG. 1. With this construction, a modified form of securing and bonding body 29, generally similar to 24, is employed, wherein sides of the body adjacent the eye 12' are contracted, as seen at 30 in FIG. 4, to form what might be termed a neck portion, beyond which is a head 31 defined by laterally flared portions 32 and a rounded hook end 33, shown clearly in FIG. 5, which passes around the bend 21' and extends into the eye 12', as clearly shown. The lower portion of the head terminates in a curved part 34, which partially envelopes the eye 12' adjacent the shank 11'. This head construction positively retains the body 29 against shifting displacement on the shank and eye; whereas, the offset end 23' definitely keys the guard or the end portions 22' thereof against displacement from the body 29. The end portion of the body 29 opposed to the head 21 is contracted, as seen at 35, similar to the contraction 26 in FIGS. 1 and 2 of the drawing.

From the foregoing, it will be apparent that a weedless hook structure can be simply and economically produced and in a manner wherein the guard wire or strand is fixedly retained upon the shank of the hook and the bonding body 24–29 will permit free use of the hook, without said body, or in other words the securing means for the guard, becoming snarled with or otherwise fixed to underwater growths or articles which might otherwise be engaged by the hook structure.

Having fully described my invention, what I claim as new and desire to secure by Letters Patent is:

1. A weedless fish hook comprising a barbed end and eye end, adjacent which is an elongated shank, the barbed end joining the shank in a reversely curved portion, a guard element comprising a strand looped centrally to form one end arranged adjacent said barbed end, the other end of said element comprising two offset strands engaging and paralleling the shank adjacent said eye end, said element including a bent portion extending through the eye end, a molded bonding body enveloping the shank and second named end of said guard element in retaining the guard element upon the hook, said fish hook, guard element and molded body having interengaging means retaining the molded body against movement on said fish hook, said last named means comprising a head on said molded body, said head having laterally flared portions engaging part of said eye end, and said head including a hook end defining an upper portion overlying said bent portion of the element and spaced from a lower portion of the head and between which the guard element extends outwardly from the eye end.

2. A weedless fish hook comprising an elongated shank having an eye at one end, a barb joining the shank in a reversely curved portion, a guard element including a bent portion arranged in said eye, the element having an offset end arranged directly upon and paralleling said shank and an end extending from said bent portion to engage said barb, a molded body retaining the guard element upon the hook, said body enveloping the first named end of the guard element and the adjacent portion of said shank, said body including means retaining the body against movement on the hook, said last named means comprising a head having laterally flared portions engaging part of the eye end of the hook, and said head including bent portion of the element and spaced from a lower portion of the head and between which the guard element extends outwardly from the eye end.

References Cited by the Examiner

UNITED STATES PATENTS

| | | | |
|---|---|---|---|
| 719,704 | 2/03 | Trakel | 43—43.6 |
| 797,281 | 8/05 | Henzel | 43—43.6 |
| 1,156,152 | 10/15 | Krenrick | 43—44.83 |
| 2,094,267 | 9/37 | Faria | 43—44.83 |
| 2,518,487 | 8/50 | Metz | 43—42.37 X |
| 2,577,466 | 12/51 | Jones | 43—44.83 X |
| 2,708,325 | 5/55 | Dillon | 43—42.28 |
| 2,792,664 | 5/57 | Schwarzer | 43—44.83 X |

ABRAHAM G. STONE, *Primary Examiner.*